United States Patent [19]
Fukuyama et al.

[11] Patent Number: 5,251,136
[45] Date of Patent: Oct. 5, 1993

[54] ACTIVELY CONTROLLED SUSPENSION SYSTEM FOR AUTOMOTIVE VEHICLES

[75] Inventors: Kensuke Fukuyama; Naoto Fukushima; Yosuke Akatsu; Itaru Fujimura; Masaharu Sato, all of Kanagawa, Japan

[73] Assignee: Nissan Motor Company, Ltd., Japan

[21] Appl. No.: 825,215

[22] Filed: Jan. 24, 1992

[30] Foreign Application Priority Data

Jan. 29, 1991 [JP] Japan .................................. 3-8958

[51] Int. Cl.⁵ .............................................. B60G 17/00
[52] U.S. Cl. .............................. 364/424.05; 280/707; 280/840
[58] Field of Search ................... 364/424.05; 280/703, 280/707, 840

[56] References Cited

U.S. PATENT DOCUMENTS

| | | | |
|---|---|---|---|
| 4,712,807 | 12/1987 | Kurosawa | 280/707 |
| 4,948,164 | 8/1990 | Hano et al. | 280/707 |
| 5,092,624 | 3/1992 | Fukuyama et al. | 280/707 |
| 5,103,397 | 4/1992 | Ikemoto et al. | 364/424.05 |

FOREIGN PATENT DOCUMENTS 2-3511 1/1990 Japan .

*Primary Examiner*—Gary Chin
*Attorney, Agent, or Firm*—Lowe, Price, LeBlanc & Becker

[57] ABSTRACT

An actively controlled suspension system for automotive vehicles includes a lateral acceleration sensor and a controller for suppressing rolling of the vehicle. The controller controls a distribution ratio of anti-roll moment or lateral load shift between a driven wheel and a non-driven wheel so as to enhance steering characteristics of the vehicle. The controller changes the distribution ratio depending on both the lateral acceleration and the wheel speed difference between the driven wheel speed and the non-driven wheel speed such that the distribution ratio at a non-driven wheel side of suspension system is increased from a designated reference value according to the increase in the wheel speed difference and a rate of change in the distribution ratio is attenuated towards the designated reference value according to the increase in the lateral acceleration.

16 Claims, 10 Drawing Sheets

ACTIVELY CONTROLLED SUSPENSION SYSTEM FOR AUTOMOTIVE VEHICLES

BACKGROUND OF THE INVENTION

1. Field of the Invention

The present invention relates to an actively controlled automotive suspension system which is capable of actively varying suspension characteristics and specifically to technologies for actively controlling lateral load shift to be shifted between left and right wheels and for actively controlling a distribution ratio of anti-rolling moment created at both front and rear suspension systems, depending on a road surface condition, such as snow, icy or wet roads and dry pavement, and a lateral acceleration exerted on the vehicular body during turns, so as to improve steering characteristics and to enhance cornering and driving stability of the vehicle.

2. Description of the Background Disclosure

Recently, there have been proposed and developed various active suspension control systems for automotive vehicles, which act in an active manner for suppressing vehicular attitude change, such as rolling, pitching, bouncing or the like, and thus achieve both riding comfort and driving stability. One such active suspension control system has been disclosed in Japanese Patent First Publication No. Heisei 2-3511. As is well known, such an active suspension system operates to generate anti-rolling moments at both front and rear suspension systems so as to suppress rolling of the vehicle on turns. The magnitude of anti-rolling moment created at front and rear suspension systems is varied substantially in proportion to the magnitude of a lateral acceleration exerted on the vehicular body. The conventional active suspension control system is utilized for a rear-wheel drive vehicle and comprises a controller for controlling a proportional gain for anti-rolling moment generated at a rear suspension system depending on a road surface condition, such as icy or wet roads and dry pavement such that a distribution ratio of anti-rolling moment of the rear suspension system to the front suspension system is reduced when the controller determines that the vehicle is travelling on a low road surface. That is, a lateral load shift provided at the rear suspension system is relative to that at the front suspension system during turns on a low frictional road surface so that cornering force created at the rear wheels is increased, i.e., the rear-wheel tires grip sufficiently on a low frictional road. As a result, both cornering stability and driving stability of the vehicle are enhanced during turns on a low frictional road.

In the previously noted conventional anti-roll controlling system, the road surface condition is detected by either a lateral acceleration sensor for monitoring a lateral acceleration exerted on the vehicular body or at least two wheel speed sensors for monitoring both a driven wheel rotational speed and a non-driven wheel rotational speed. A controller employed in the prior art anti-rolling controlling system would determine that the road surface condition corresponds to a low frictional road when the monitored lateral acceleration is within a designated small lateral acceleration range or when the rotational speed difference between front and rear wheel speeds exceeds a preset threshold. When the low frictional road condition is satisfied, the controller controls anti-rolling moments between both front and rear wheels in such a manner as to reduce the distribution ratio of anti-rolling moment of the rear suspension system to the front suspension system. Such an anti-roll control results in understeer tendencies of the vehicle during turns on a low frictional road. As is generally known, when the rear-wheel drive vehicle turns on a low frictional road in its critical operating state, the rear wheels (driven wheels) skid with a great speed difference between front and rear wheel speeds and therefore the rear wheels could throw the entire car into a rear-end skid. This could result in oversteer and/or spinning on wet or icy roads. As previously described, the conventional anti-roll controlling system could satisfactorily eliminate oversteer tendencies of the vehicle during turns on a low frictional road because of a smaller lateral load shift at the rear suspension system than that at the front suspension system. However, if a lateral acceleration sensor is utilized for judging a low frictional road surface condition, there is a possibility of malfunction of the controller employed in the anti-roll controlling system, during a moderate turn of the vehicle with a relatively small lateral acceleration. Due to malfunction of the controller, the distribution ratio of anti-rolling moment of the rear suspension system to the front suspension system is reduced, with the result that the vehicle may experience a stronger understeer during a moderate turn. Under this condition, great steering effort may be required due to malfunction of the controller.

On the other hand, if the rotational speed difference between front and rear wheel speeds is utilized for judging a low frictional road surface condition, detection accuracy for a low friction road condition is enhanced since the low frictional road condition is satisfied only when the driven wheels actually skid and the wheel speed difference exceeds a preset threshold. It is undesirable to occur stronger understeer by activation of the anti-roll controlling system even during a high-speed turn on a high friction road, such as dry pavement, i.e., even when the rear-wheels slip on a high friction road, due to an excessively great driving torque applied to the driven wheels. If the threshold of the wheel speed difference is set at a higher level, the number of activation of the anti-roll controlling system is extremely reduced, since the anti-roll control is achieved only when the controller detects an excessively great wheel speed difference. This results in an unsufficient cornering stability of the vehicle during turns on a low frictional road surface.

Therefore, it is desirable to provide an anti-roll controlling system having a high reliability of an anti-roll control, irrespective of a road surface condition, a lateral acceleration exerted on a vehicular body, and the wheel speed difference between driven and non-driven wheels.

SUMMARY OF THE INVENTION

It is, in view of the above disadvantages, a principal object of the present invention to provide an actively controlled suspension system for automotive vehicles which can provide a high reliability of an anti-rolling control during turns, irrespective of a road surface condition, such as icy or wet roads and dry pavement, a lateral acceleration exerted on the vehicle body, and the wheel speed difference between driven and non-driven wheels.

It is another object of the invention to provide an anti-roll controlling system for automotive vehicles which can provide a high cornering stability of the vehicle, irrespective of a road surface condition.

It is a further object of the invention to provide an anti-roll controlling system for automotive vehicles which can insure both reasonable anti-roll effect and superior steering characteristics during turns, irrespective of a road surface condition.

It is a still further object of the invention to provide an anti-roll controlling system for automotive vehicles which can provide an optimal lateral load shift distribution between front and rear suspension systems, irrespective of the degree of turn of the vehicle, such as hard turn or moderate turn, and the magnitude of slippage of driven wheel.

In order to accomplish the aforementioned and other objects, an actively controlled suspension system for an automotive vehicle is provided, which includes: a sensor for monitoring a lateral acceleration exerted on a vehicle body, to generate a lateral acceleration indicative signal; a control element for controlling a lateral load shift between left and right wheels depending on the lateral acceleration indicative signal so as to suppress rolling of the vehicle body; an element for controlling a distribution ratio of said lateral load shift, between a driven wheel side of suspension system and a non-driven wheel side of suspension system, so as to enhance steering characteristics of the vehicle; a speed sensor for monitoring a driven wheel speed to generate a driven wheel speed indicative signal; and another sensor for monitoring a non-driven wheel speed to generate a non-driven wheel speed indicative signal. The lateral load shift distribution ratio controlling element includes a selection element for selecting a change mode of said distribution ratio depending on both the lateral acceleration and a wheel speed difference derived from the driven wheel speed indicative signal and the non-driven wheel speed indicative signal. The change mode selecting means determines the change mode of distribution ratio such that said distribution ratio of the non-driven wheel side of suspension system is increased according to an increase in the wheel speed difference and a rate of change in the distribution ratio of the non-driven wheel side of suspension system is decreased according to the increase in the lateral acceleration. The change mode selecting means includes a first function generating means for holding the distribution ratio at a designated reference value when the wheel speed difference is less than a preset threshold, and for increasing the distribution ratio of the non-driven wheel side of suspension system with a controllable gain according to an increase in the wheel speed difference after the wheel speed difference reaches the threshold, and a second function generating element for attenuating the rate of change of the distribution ratio according to the increase in the lateral acceleration such that the distribution ratio is approached towards the designated reference value. The second function generating element includes a function generator for exponentially decreasing the controllable gain according to the increase in the lateral acceleration and another function generator for compensating a limit of the distribution ratio towards the designated reference value according to the increase in the lateral acceleration. Preferably, the lateral load shift controlling element may linearly increase the lateral load shift in proportion to the increase in the lateral acceleration.

According to another aspect of the invention, an actively controlled suspension system for an automotive vehicle includes; a first suspension system disposed between a vehicle body and a suspension member rotatably suspending at least one pair of non-driven wheels, the first suspension system employing a first pair of fluid pressure operated cylinders, for providing a first lateral load shift variable via working fluid pressure supplied thereto; a second suspension system disposed between the vehicle body and a suspension member rotatably suspending at least one pair of driven wheels, the second suspension system employing a second pair of fluid pressure operated cylinders for providing a second lateral load shift variable via working fluid pressure supplied thereto; a first fluid pressure control valve connected to the first pair of cylinders, for varying the first lateral load shift created at the first suspension system in accordance with a first command: a second fluid pressure control valve connected to the second pair of cylinders, for varying the second lateral load shift created at the second suspension system in accordance with a second command; an acceleration sensor for monitoring a lateral acceleration exerted on the vehicle body; an element for deriving a wheel speed difference between a driven wheel speed and a non-driven wheel speed; and an element for controlling the first and second lateral load shifts independently of each other so as to suppress rolling of the vehicle body and to enhance steering characteristics of the vehicle. The controlling element includes a first arithmetic unit for deriving an entire magnitude of the first and second lateral load shifts depending on the lateral acceleration such that the entire magnitude is proportional to the lateral acceleration, and a second arithmetic unit for deriving a distribution ratio between the first and second lateral load shifts depending on both the lateral acceleration and the wheel speed difference such that a distribution ratio of the first lateral load shift is increased according to an increase in the wheel speed difference and a rate of change in the distribution ratio of the first lateral load shift is decreased according to the increase in the lateral acceleration. The controlling element generates the first and second commands based on both said entire magnitude and the distribution ratio of lateral load shift, so as rate the first and second pressure control valves.

According to a further aspect of the invention, an actively controlled, suspension system for a rear-wheel drive vehicle includes: a front suspension system disposed between a vehicle body and a suspension member rotatably suspending at least one pair of front wheels, the front suspension system employing a front pair of fluid pressure operated cylinders for providing a front lateral load shift variable via working fluid pressure supplied thereto; a rear suspension system disposed between the vehicle body and a suspension member rotatably suspending at least one pair of rear wheels, the rear suspension system employing a rear pair of fluid pressure operated cylinders for providing a rear lateral load shift variable via working fluid pressure supplied thereto; a front fluid pressure control valve connected to the front pair of cylinders, for varying the front lateral load shift created at the front suspension system in accordance with a first command; a rear fluid pressure control valve connected to the rear pair of cylinders, for varying the rear lateral load shift created at said rear suspension system in accordance with a second command; an acceleration sensor for monitoring a lateral acceleration exerted on the vehicle body; an element for deriving a wheel speed difference between front and rear wheel speeds; and an element for controlling the front and rear lateral load shifts independently of each other so as to suppress rolling of the vehicle body and to enhance steering characteristics of the vehicle. The controlling element includes a first arithmetic unit for deriving an entire magnitude of the front and rear lateral load shifts depending on the lateral acceleration such that the entire magnitude is proportional to the lateral acceleration, and a second arithmetic unit for deriving a distribution ratio between the front and rear lateral load shifts depending on both the lateral acceleration and the wheel speed difference such that a distribution ratio of the front lateral load shift is increased according to an increase in the wheel speed difference and a rate of change in the distribution ratio of the front lateral load shift is decreased according to the increase in the lateral acceleration. The controlling element generates the first and second commands based on both the entire magnitude and the distribution ratio of lateral load shift. The second arithmetic unit includes a first function generating element for holding the distribution ratio of the front lateral load shift at a designated reference value when the wheel speed difference is less than a preset threshold, and for increasing the distribution ratio of the front lateral load shift with a controllable gain according to an increase in the wheel speed difference after the wheel speed difference reaches the threshold, and a second function generating element for attenuating the rate of change of the distribution ratio of the front lateral load shift according to the increase in the lateral acceleration such that the distribution ratio is approached towards the designated reference value. The second function generating element includes a function generator for exponentially decreasing the controllable gain according to the increase in the lateral acceleration and another function generator for exponentially decreasing an upper limit of the distribution ratio of the front lateral load shift towards the designated reference value according to the increase in the lateral acceleration.

According to a still further aspect of the invention, an actively controlled suspension system for a front-wheel drive vehicle, includes: a front suspension system disposed between a vehicle body and a suspension member rotatably suspending at least one pair of front wheels, the front suspension system employing a front pair of fluid pressure operated cylinders for providing a front lateral load shift variable via working fluid pressure supplied thereto; a rear suspension system disposed between the vehicle body and a suspension member rotatably suspending at least one pair of rear wheels, the rear suspension system employing a rear pair of fluid pressure operated cylinders for providing a rear lateral load shift variable via working fluid pressure supplied thereto: a front fluid pressure control valve connected to the front pair of cylinders, for varying the front lateral load shift created at the front suspension system in accordance with a first command; a rear fluid pressure control valve connected to the rear pair of cylinders for varying the rear lateral load shift created at the rear suspension system in accordance with a second command; an acceleration sensor for monitoring a lateral acceleration exerted on the vehicle body; an element for deriving a wheel speed difference between front and rear wheel speeds; and an element for controlling said front and rear lateral load shifts independently of each other so as to suppress rolling of the vehicle body and to enhance steering characteristics of the vehicle. The controlling means includes a first arithmetic unit for deriving an entire magnitude of the front and rear lateral load shifts depending on the lateral acceleration such that the entire magnitude is proportional to the lateral acceleration, and a second arithmetic unit for deriving a distribution ratio between the front and rear lateral load shifts depending on both the lateral acceleration and the wheel speed difference such that a distribution ratio of the rear lateral load shift is increased according to an increase in the wheel speed difference and a rate of change in the distribution ratio of the rear lateral load shift is decreased according to the increase in the lateral acceleration. The controlling element generates the first and second commands based on both the entire magnitude and the distribution ratio of lateral load shift. The second arithmetic unit includes a first function generating element for holding the distribution ratio of the front lateral load shift at a designated reference value when the wheel speed difference is less than a preset threshold, and for decreasing the distribution ratio of the front lateral load shift with a negative controllable gain according to an increase in the wheel speed difference after the wheel speed difference reaches the preset threshold, and a second function generating element for attenuating the rate of change of the distribution ratio of the front lateral load shift according to the increase in the lateral acceleration such that the distribution ratio is approached towards the designated reference value. The second function generating element includes a function generator for exponentially increasing the negative controllable gain according to the increase in the lateral acceleration and another function generator for exponentially increasing a lower limit of the distribution ratio of the front lateral load shift towards the designated reference value according to the increase in the lateral acceleration.

The above actively controlled suspension system may include a vehicle speed sensor for monitoring a vehicle speed so as to increase the rate of change in the distribution ratio of the front lateral load shift by a designated correction factor increased in a linear fashion according to an increase in the vehicle speed.

DESCRIPTION OF THE PREFERRED EMBODIMENTS

Figure 1:
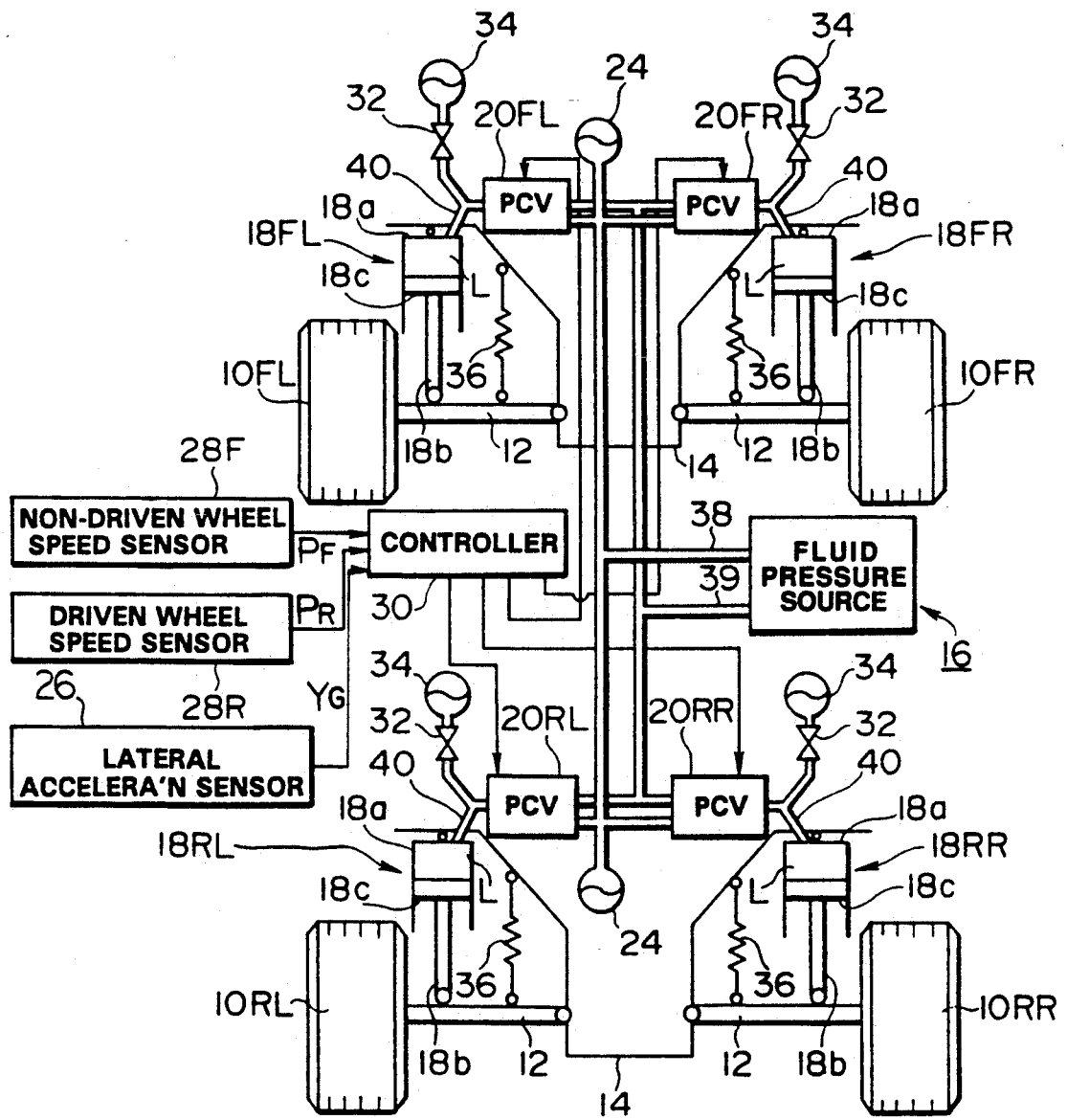
FIG. 1 is an illustration of the overall construction of a preferred embodiment of an actively controlled suspension system for automotive vehicles according to the invention.

Referring now to the drawings, particularly to FIG. 1, the preferred embodiment of an actively controlled suspension system, according to the invention, is designed generally to perform a suspension control, such as anti-rolling control for suppressing relative displacement between a vehicle body 14 (sprung mass) and suspension members 12 (unsprung mass), respectively rotatably supporting front-left, front-right, rear-left and rear-right wheels 10FL, 10FR, 10RL and 10RR. An active suspension system 16 of the invention includes front-left, front-right, rear-left and rear-right fluid pressure actuators 18FL, 18FR, 18RL and 18RR, such as hydraulic cylinders, each cylinder being disposed between the vehicle body 14 and the suspension member 12, so as to generate damping force suppressing the relative displacement between the vehicle body 14 and the suspension member 12. The system 16 also includes a fluid pressure source 22 such as an oil pump and fluid pressure control valves 20FL, 20FR, 2ORL and 20RR (identified in FIG. 1 as "PCV"), respectively connected to the fluid pressure actuators 18FL, 18FR, 18RL and 18RR so as to control working fluid pressures in the respective fluid pressure actuators independently of each other. The hydraulic cylinder will be represented by the reference numeral "18" as generally referred to and the pressure control valve will be represented by the reference numeral "20" as generally referred to. As clearly seen in FIG. 1, two pressure accumulators 24 are provided in a working fluid supply line 38 connected to the output port of the fluid pressure source 22 and upstream of the front-wheel side of pressure control valves 20FL and 20FR and upstream of the rear-wheel side of pressure control valves 2ORL and 2ORR. The system 16 includes a controller 30 for controlling working fluid pressures in the cylinders 18FL, 18FR, 18RL and 18RR independently of each other, in response to signals output from a lateral acceleration sensor 26 monitoring a lateral acceleration exerted on the vehicle body and generating a lateral acceleration indicative signal $Y_G$, a driven wheel speed sensor 28R generating pulses $P_R$ depending on the rotational speed of the driven wheel, for example the rear-left wheel 1ORL and a non-driven wheel speed sensor 28F generating pulses $P_F$ depending on the rotational speed of the non-driven wheel, for example the front-left wheel 10FL.

A suspension coil spring 36 is provided between the vehicle body 14 and the suspension member 12 in juxtaposition with the cylinder 18. The coil spring 36 does not act to generate a resilient force enough to damp the relative displacement between the vehicle body 14 and the suspension member 12, but act to support a static load of the vehicle body (sprung mass). Another accumulator 34 is provided downstream of the pressure control valve 20 so as to absorb vibrational energy exerted on the vehicular body. The accumulator 34 is communicated through a check valve 32 with a pressure chamber L of the cylinder 18.

The cylinder 18 includes a cylinder tube 18a and slidably encloses a piston 18c in a water-tight fashion. The piston 18c is connected to a piston rod 18b. As seen in FIG. 1, the other end of the piston rod 18b is pivotably connected to the suspension member 12, while the upper end of the cylinder tube 18a is pivotably connected to the vehicle body 14. The previously noted pressure chamber L is defined between the inner wall of the cylinder tube 18a and the upper surface of the piston 18c.

In the preferred embodiment, the pressure control valve 20 preferably includes a pilot-operated solenoid valve being comprised of a valve housing, a spool slidably enclosed in the valve housing, and an electromagnetic solenoid mounted on the valve housing for operating the spool in predetermined positions. The inlet port of the pressure control valve 20 communicates through the supply line 38 to the fluid pressure source 22, the exhaust port communicates through a working fluid exhaust line 39 to the fluid pressure source 22, while the outlet port communicates through a working fluid passage 40 to the pressure chamber L of the cylinder 18.

The previously noted electromagnetic solenoid valve 20 is preferably comprised of a proportional solenoid which generates an output pressure substantially in proportion to the magnitude of current i applied to the exciting coil of the solenoid. The output pressure generated from the solenoid valve 20 serves as a control pressure Pc applied to the pressure chamber L in the cylinder 18. As clearly shown in FIG. 2, the control pressure characteristic curve of the solenoid valve 20 is linearly varied substantially in proportion to an increase in the exciting current i such that the control pressure Pc is increased from a minimum pressure $p_{MIN}$ to a maximum pressure $P_{MAX}$ while the exciting current i is increased from a minimum current value $i_{MIN}$ to a maximum current value $i_{MAX}$ corresponding to the line pressure output from the fluid pressure source 22.

Figure 3:
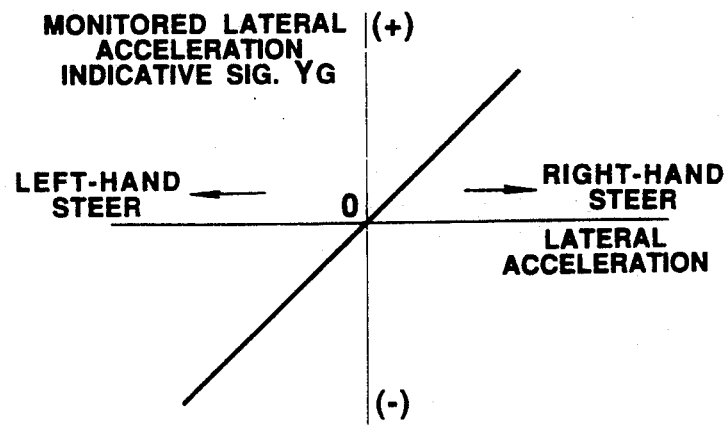
FIG. 3 is a chart illustrating the relationship between a lateral acceleration actually exerted on the vehicle body by steering operation and a lateral acceleration indicative signal value monitored by a lateral acceleration sensor.

Referring now to FIG. 3, the lateral acceleration indicative signal value $Y_G$ monitored by the lateral acceleration sensor 26 is 0 during a straight-ahead driving, the monitored signal value $Y_G$ increases according to an increase in the right-hand steering, while the monitored signal value $Y_G$ decreases according to an increase in the left-hand steering.

Figure 5:
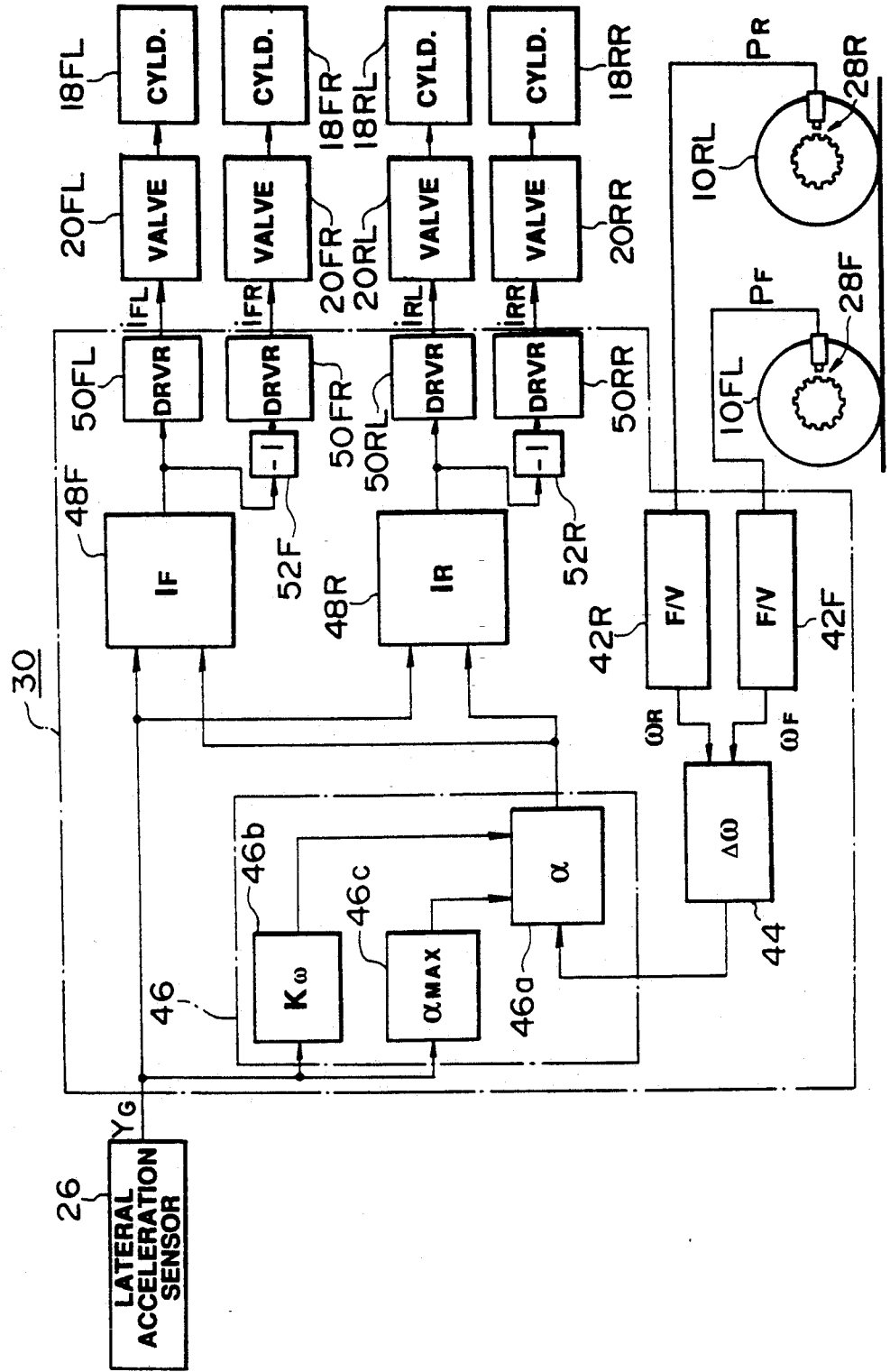
FIG. 5 is a block diagram illustrating a controller employed in the first embodiment of the actively controlled suspension system according to the invention which is applied for rear-wheel drive vehicles.

As shown in FIG. 5, the controller 30 of the first embodiment comprises a frequency-to-voltage converter 42R for generating a voltage $\omega_R$ proportional to the number of the pulses $P_R$ generated from the driven wheel speed sensor 28R for a designated period of time, and a frequency-to-voltage converter 42F for generating a voltage $\omega_F$ proportional to the number of the pulses $P_F$ generated from the non-driven wheel speed sensor 28F for the designated period of time, and a wheel speed difference arithmetic circuit 44 connected to both frequency-to-voltage converters 42R and 42F for deriving the wheel speed difference $\Delta\omega$ between the driven wheel and the non-driven wheel, on the basis of the voltages $\omega_R$ and $\omega_F$. The wheel speed difference $\Delta\omega$ is equal to $|\omega_R - \omega_F|$. The controller 30 includes an anti-rolling moment distribution-ratio setting circuit 46 connected to both the sensor 26 and the circuit 44 for generating a signal indicative of a distribution ratio $\alpha$ of anti-rolling moment of the front suspension system (non-driven wheel side) on the basis of the signals $Y_G$ and $\Delta\omega$, a front-wheel side of command signal arithmetic circuit 48F for generating a command signal $I_F$ for the front-wheel side of pressure control valve 20 on the basis of the signals $Y_G$ and $\alpha$, and a rear-wheel side of command signal arithmetic circuit 48R for generating a command signal $I_R$ for the rear-wheel side of pressure control valve 20 on the basis of the signals $Y_G$ and $\alpha$. The controller 30 also includes four drivers 50FL, 50FR, 5ORL and 5ORR (each identified in FIG. 5 as "DRVR") and two inverters 52F and 52R. The driver 50FL is connected to the pressure control valve 20FL for outputting a driving current $i_{FL}$ obtained by amplifying the command signal $I_F$ while the driver 50FR is connected to the pressure control valve 20FR for outputting a driving current $i_{FR}$ obtained by amplifying the command signal $-I_F$ inverted by means of the inverter 52F. The driver 5ORL is connected to the pressure control valve 2ORL for outputting a driving current $i_{RL}$ obtained by amplifying the command signal $I_R$, while the driver 5ORR is connected to the pressure control valve 2ORR for outputting a driving current $i_{RR}$ obtained by amplifying the command signal $-I_R$ inverted by means of the inverter 52R.

Figure 6:
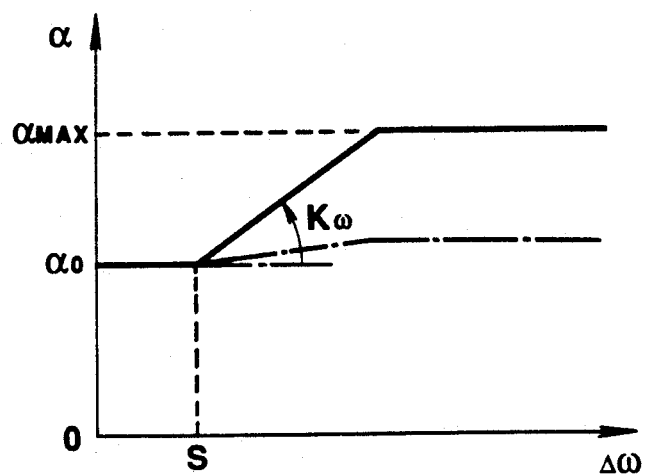
FIG. 6 is a chart illustrating the relationship between the wheel speed difference and a distribution ratio of anti-rolling moment of the front suspension system to the rear suspension system, varied according to the anti-rolling control of the first embodiment.
Figure 7:
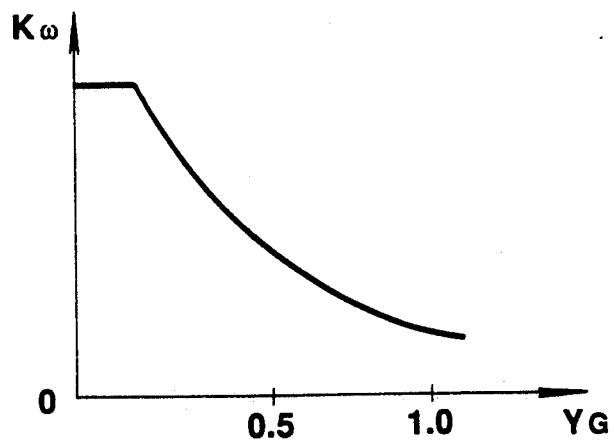
FIG. 7 is a characteristic curve of a proportional gain for the distribution ratio of anti-rolling moment created at the front suspension system with regard to the lateral acceleration, in the first embodiment.
Figure 8:
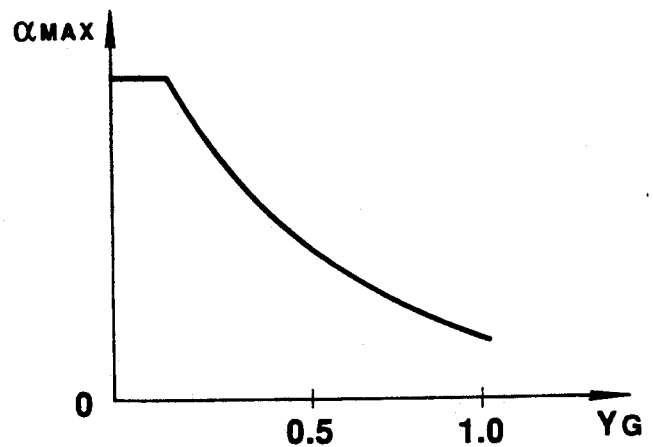
FIG. 8 is a characteristic curve of an upper limit of the distribution ratio of anti-rolling moment created at the front suspension system with regard to the lateral acceleration, in the first embodiment.

As shown in FIG. 6, the distribution ratio $\alpha$ of anti-rolling moment of the front suspension system is kept in a preset value a $\alpha_0$ until the wheel speed difference $\Delta\omega$ reaches a preset threshold S. The preset value a $\alpha_0$ is selected in such a manner as to achieve a substantially neutral steer of the vehicle during a moderate turn on dry pavement, for example. The distribution ratio $\alpha$ is increased with a predetermined proportional gain $K\omega$ and finally reaches an upper limit a $\alpha_{MAX}$, while the wheel speed difference $\Delta\omega$ exceeds the threshold S. After this, even when the wheel speed difference $\Delta\omega$ is subsequently increased, the distribution ratio $\alpha$ is maintained at the upper limit $\alpha_{MAX}$. Note that the anti-rolling moment distribution-ratio setting circuit 46 of the controller 30 according to the invention comprises a first function generator 46b for generating the gain $K\omega$ having an inherent gain characteristic wherein the gain $K\omega$ is exponentially decreased according to an increase in the lateral acceleration indicative signal $Y_G$, as shown in FIG. 7, a second function generator 46c for generating the upper limit a $\alpha_{MAX}$ having an inherent upper limit characteristic wherein the upper limit $\alpha_{MAX}$ is exponentially decreased according to an increase in the lateral acceleration indicative signal $Y_G$, as shown in FIG. 8, and a third function generator 46a receiving both the gain indicative signal $K\omega$ and the upper limit indicative signal $\alpha_{MAX}$ from the two function generators 46b and 46c and generating the distribution ratio indicative signal $\alpha$ of anti-rolling moment to be created at the front suspension system, as shown in FIG. 6. In this manner, since the function generator 46a of the controller 30 of the embodiment generates the function a represented by $\alpha = f(\Delta\omega, Y_G)$, varied depending on both the wheel speed difference $\Delta\omega$ and the lateral acceleration $Y_G$, a reliable distribution ratio of anti-rolling moment between front and rear suspension systems can be provided irrespective of a road surface condition, such as icy or wet roads and dry pavement, as hereinbelow described in detail.

The front-wheel side of command signal arithmetic circuit 48F derives a front-wheel side of anti-roll gain $K_F$ according to an equation $K_F = \alpha K$, wherein K is constant and $\alpha$ corresponds to the distribution ratio indicative signal $\alpha$ generated by the anti-rolling moment distribution-ratio setting circuit 46. The arithmetic circuit 48F derives the command signal $I_F$ (equal to $K_F Y_G$) by multiplying the anti-roll gain $K_F$ by the lateral acceleration indicative signal $Y_G$. Similarly, the rear-wheel side of command signal arithmetic circuit 48R derives a rear-wheel side of anti-rolling gain $K_R$ according to an equation $K_R = (1-\alpha)K$, wherein K is constant and $(1-\alpha)$ corresponds to the distribution ratio of anti-rolling moment at the rear suspension system. The arithmetic circuit 48R derives the command signal $I_R$ (equal to $K_R Y_G$) by multiplying the anti-roll gain $K_R$ by the lateral acceleration indicative signal $Y_G$ (identified in the figures as "DRVR").

Figure 2:
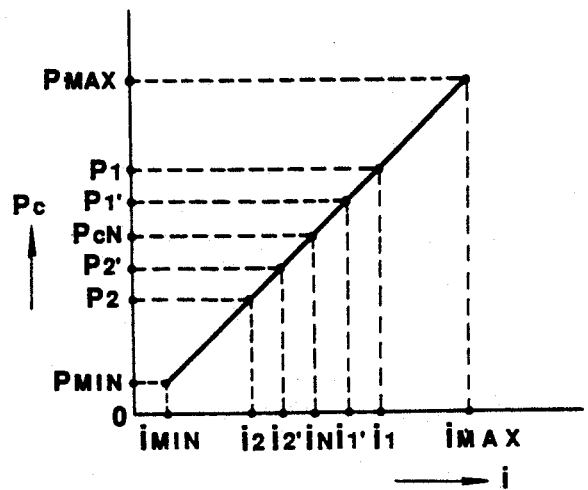
FIG. 2 is a chart illustrating the relationship between an exciting current value applied to a fluid pressure control valve employed in the preferred embodiment and a hydraulic pressure in the pressure chamber of the fluid pressure control valve.
Figure 4:
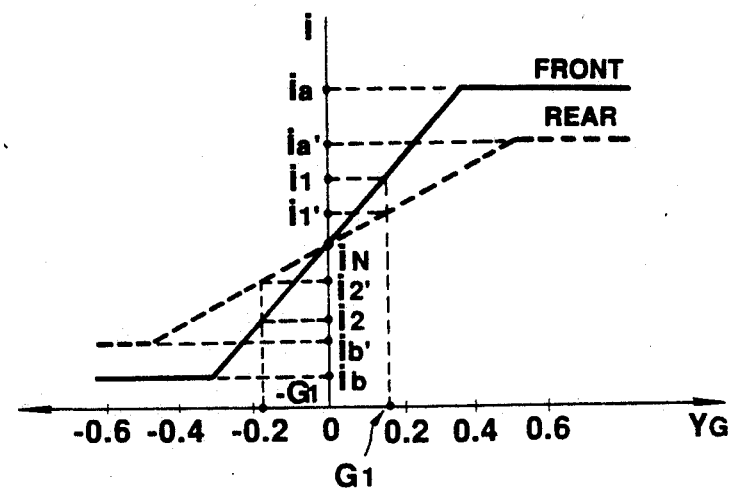
FIG. 4 is a chart illustrating the relationship between the monitored lateral acceleration and the exciting current value in the absence of the wheel speed difference between a driven wheel and a non-driven wheel.

Each of the drivers 50FL, 50FR, 5ORL, and 5ORR generates the driving current or the exciting current for the solenoid, in such a manner as to add a neutral current $i_N$ to the received command signal. When the neutral current $i_N$ is applied to the solenoid of the pressure control valve 20, the valve 20 generates a neutral control pressure $P_{cN}$ as shown in FIG. 2 and thus the piston 18c of the cylinder 18 is held in a neutral position, so as to provide a standard vehicular attitude. The stiffness of the front-left wheel side of cylinder 18FL is equivalent to that of the front-right wheel side of cylinder 18FR and the stiffness of the rear-left wheel side of cylinder 18RL is equivalent to that of the rear-right wheel side of cylinder 18RR, under such a condition that the neutral control pressure $P_{cN}$ is applied to the pressure chamber L of each cylinder 18. Under this condition, both anti-roll moments created at the front and rear suspension systems are equal to approximately 0. Assuming that the wheel speed difference $\Delta\omega$ is 0 and the preset value $\alpha_0$ of the front-wheel side of distribution ratio of anti-rolling moment is set to 0.6, for example, the exciting current i is varied in accordance with a characteristic curve as shown in FIG. 4 such that the exciting current i is held at the neutral current $i_N$ when the lateral acceleration indicative signal $Y_G$ is 0, the exciting current i is increased from the neutral current $i_N$ according to an increase in the lateral acceleration indicative signal $Y_G$ in the positive direction due to right-hand steering, and the exciting current i is decreased from the neutral current $i_N$ according to an increase in the lateral acceleration indicative signal $Y_G$ in the negative direction due to left-hand steering. As clearly seen in FIG. 4, a proportional gain or proportional constant of the front-wheel side of exciting current becomes greater than that of the rear-wheel side of exciting current, since the preset value $\alpha_0$ of the front-wheel side of distribution ratio of anti-rolling moment is set to 0.6, while the rear-wheel side of distribution ratio of anti-rolling moment is set to $(1-0.6) = 0.4$. Furthermore, since each of the pressure control valves 20FL, 20FR, 20RL, and 20RR has both upper and lower limits with regard to the control pressure Pc, the solenoid has upper limits ia and ia' and lower limits ib and ib'. It is advantageous for the driver to feel a slight rolling created due to the above upper and lower limits when the vehicle experiences rolling during hard turns, since the driver can feel predictively via the slight rolling moment whether the vehicle is close to the critical state, during hard turns with a great lateral acceleration.

Returning to FIGS. 2 and 4, assuming that the right-hand turn is made with a lateral acceleration $G_1$ and the wheel speed difference $\Delta\omega$ is approximately 0, i e., such that the vehicle turns rightwards on a high frictional road, such as dry pavement, the front-wheel side of distribution ratio $\alpha$ of anti-rolling moment is kept to the preset value $\alpha_0$ and therefore, as seen in FIG. 4, the exciting currents applied to the front-left and front-right pressure control valves 20FL and 20FR are set to $i_1$ and $i_2$, while the exciting currents applied to the rear-left and rear-right pressure control valves 20RL and 20RR are set to $i_1'$ and $i_2'$. Thereafter, the control pressures applied to the respective cylinders 18 are set to $P_1$, $P_2$, $P_1'$ and $P_2'$ in response to the exciting currents $i_1$, $i_2$, $i_1'$ and $i_2'$, as seen in FIG. 2. In this manner, when the right-turn is made with a lateral acceleration $G_1$, a lateral load shift shifted from the front-left wheel 10FL to the front-right wheel 10FR is adjusted to a slightly greater value than that shifted from the rear-left wheel 10RL to the rear-right wheel 10RR. As a result, the vehicular attitude change is effectively suppressed so as to enhance riding comfort and in addition the steering characteristics of the vehicle is kept in a substantially neutral steer.

The operation of the controller 30 of the first embodiment is hereinafter described in detail in accordance with various driving conditions of the vehicle.

During a straight-ahead driving on a high frictional, smooth road, such as dry pavement, the lateral acceleration indicative signal $Y_G$ is approximately 0. Therefore, the first function generator 46b generates a relatively great gain $K\omega$ and the second function generator 46c also generates a relatively great upper limit $\alpha_{MAX}$. Therefor, the third function generator 46a generates the anti-rolling moment distribution-ratio indicative signal a varied along the solid line shown in FIG. 6. Since the wheel-slippage at driven wheels is approximately 0 in such a straight-ahead driving condition on dry pavement, the wheel speed difference $\Delta\omega$ is approximately 0. As a result, the anti-rolling moment distribution-ratio indicative signal $\alpha$ is set to $\alpha_0$, such as 0.6 and as a result the anti-roll gain $K_F$ at the front suspension system is set to a slightly greater value than the anti-roll gain $K_R$ at the rear suspension system. However, since the lateral acceleration indicative signal $Y_G$ is approximately 0, the command signals $I_F$ and $I_R$ for front and rear pressure control valves 20 become approximately 0. Consequently, all exciting currents $i_{FL}$, $i_{FR}$, $i_{RL}$, and $i_{RR}$ are set to the neutral current $i_N$ and therefore the control pressure Pc in each pressure chamber L also is set to the neutral control pressure $P_{cN}$. Since the vehicle hardly experiences rolling during the straight-ahead driving on smooth, dry pavement, the previously noted operation of the controller 30 is desirable.

When the driving condition of the vehicle is varied from a straight-ahead driving state to a moderate left or right turn on smooth, dry pavement, a relatively small lateral acceleration indicative signal $Y_G$ is generated from the sensor 26 and the wheel speed difference $\Delta\omega$ is substantially 0, since the driven wheel slippage is approximately 0. Under this condition, as shown in the solid line of FIG. 6, the anti-rolling moment distribution-ratio indicative signal $\alpha$ is maintained at $\alpha_0$. As previously described, assuming that the preset value $\alpha_0$ is set to 0.6, the command signal $I_F$ represented by the product of $\alpha_0$, K and $Y_G$ becomes slightly greater than the command signal $I_R$ represented by the product of $(1-\alpha_0)$, K and $Y_G$. Therefor, an increased fluid pressure in the pressure chamber of the front cylinder 18 included in the outside wheel becomes slightly greater than that of the rear cylinder 18 included in the outside wheel, while a decreased fluid pressure in the pressure chamber of the front cylinder 18 included in the inside wheel becomes slightly greater than that of the rear cylinder 18 included in the inside wheel. That is, a lateral load shift at the front suspension system becomes slightly greater than that at the rear suspension system. This means that the anti-rolling moment at the front suspension system is substantially equivalent to that at the rear suspension system, because the lateral load shift difference between front and rear suspension systems is extremely small. This results in a substantially neutral steer of the vehicle during a moderate turn on smooth, dry pavement.

When the driving condition is changed from a straight-ahead driving to a quick left or right turn on a high friction road, such as smooth, dry pavement, the lateral acceleration indicative signal $Y_G$ becomes great. As clearly shown in FIGS. 7 and 8, the function generator 46b generates a relatively small gain $K\omega$ and the function generator 46c generates a relatively small upper limit a $\alpha_{MAX}$. Therefor, the function generator 46a generates the anti-rolling moment distribution-ratio indicative signal a varied along the dotted line shown in FIG. 6. As appreciated from FIG. 6, the upper limit a $\alpha_{MAX}$ is in close proximity to the preset value $\alpha_0$ and in addition a variation gradient of the distribution-ratio indicative signal $\alpha$ is small due to a small gain $K\omega$, even when the wheel speed difference $\Delta\omega$ exceeds the preset threshold S. That is, during a hard turn on dry pavement, the distribution-ratio $\alpha$ is kept in the vicinity of the preset value $\alpha_0$, irrespective of the wheel speed difference. The lateral load shifts at both front and rear suspension systems become substantially equivalent to each other, with the result that the steering characteristics is kept in a substantially neutral steer. Such an anti-roll controlling operation satisfactorily eliminates stronger understeer occurring by malfunction of the previously described conventional anti-roll controlling system during a high-speed turn on a high friction road, thereby resulting in an easy steering effort of the driver even during the high-speed turn on dry pavement.

During a straight-ahead driving on a low frictional road surface, such as icy, wet, or snow roads, the lateral acceleration indicative signal $Y_G$ is approximately 0. Therefore, the controller operates in the same manner as the anti-roll control operation executed during a straight-ahead driving on a high friction road.

When the driving condition is changed from a straight-ahead driving on a low friction road to a left or right turn on a low friction road, the sensor 26 generates the lateral acceleration indicative signal $Y_G$ essentially proportional to the degree of turning. As is generally known, during turns on a low friction road, the lateral acceleration exerted on the vehicle body does not become approached to a great value but maintained at a small value, for example 0.3G, 0.2G or less, due to early occurrence of driven-wheel slippage. Therefore, in the same manner as described in the control operation of the controller during a moderate turn on a high friction road, the function generator 46b generates a relatively great gain $K\omega$ and the function generator 46c generates a relatively great upper limit $\alpha_{MAX}$, with the result that the function generator 46a generates the anti-rolling moment distribution-ratio indicative signal $\alpha$ varied along the solid line shown in FIG. 6. Therefore, when the wheel speed difference $\Delta\omega$ is less than the preset threshold S, the anti-rolling moment distribution-ratio indicative signal $\alpha$ is kept at the preset value $\alpha_0$ so as to provide a substantially neutral steer. When the wheel speed difference $\Delta\omega$ exceeds the preset threshold S according to an increase in driven-wheel slippage (rear-wheel slippage), the anti-rolling moment distribution-ratio $\alpha$ at the front suspension system is increased with a great gain $K\omega$ according to an increase in the wheel speed difference $\Delta\omega$, while the anti-rolling moment distribution-ratio $(1-\alpha)$ at the rear suspension system is decreased according to the wheel speed difference $\Delta\omega$. Since the lateral load shift at the front suspension system is proportional to the distribution ratio $\alpha$ and the lateral load shift at the rear suspension system is proportional to the distribution ratio $(1-\alpha)$, the lateral load shift distribution-ratio of the front suspension system to the rear suspension system is rapidly increased according to the increase in the wheel speed difference $\Delta\omega$ during turns on a low friction road. In other words, the anti-rolling stiffness at the front suspension is rapidly increased, while the anti-rolling stiffness at the rear suspension system is rapidly decreased according to the increase in the wheel speed difference $\Delta\omega$, during turns on a low friction road. This results in a sufficient road grip at rear wheels (driven wheels) and a slight front-end skid of the vehicle. In this manner, during turns on a low friction road, such an anti-roll controlling operation executed for the rear-wheel drive vehicles can effectively eliminate oversteer occurring due to rear-end skid generally created by driven wheel slippage and change the steering characteristics from oversteer to lesser understeer so as to provide a high controllability of the vehicle. On the other hand, since the entire magnitude of anti-rolling moment to be distributed into both front and rear suspension systems is essentially in proportion to the magnitude of the lateral acceleration indicative signal $Y_G$, the entire magnitude of anti-rolling moment is set at a relatively low level due to a relatively small lateral acceleration, such as 0.3G or less, exerted on the vehicular body during turns on a low friction road.

Figure 9:
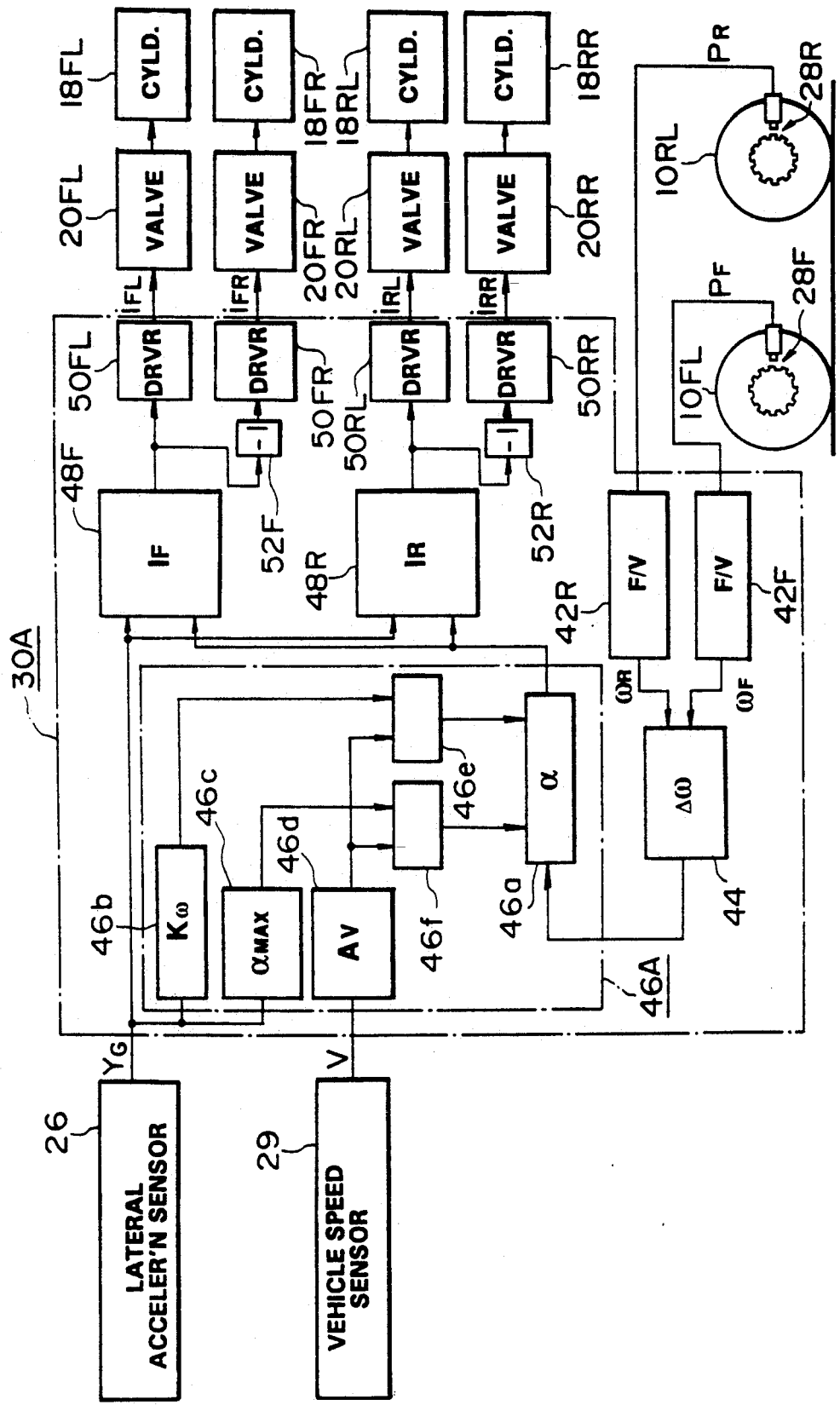
FIG. 9 is a block diagram illustrating a controller employed in the second embodiment of an actively controlled suspension system according to the invention which is applied for rear-wheel drive vehicles.
Figure 10:
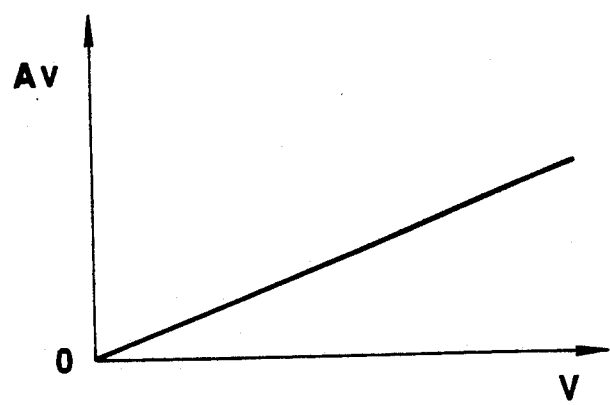
FIG. 10 is a graph illustrating a correction factor for the proportional gain shown in FIG. 7 and for the upper limit shown in FIG. 8, with regard to a vehicle speed.
Figure 11:
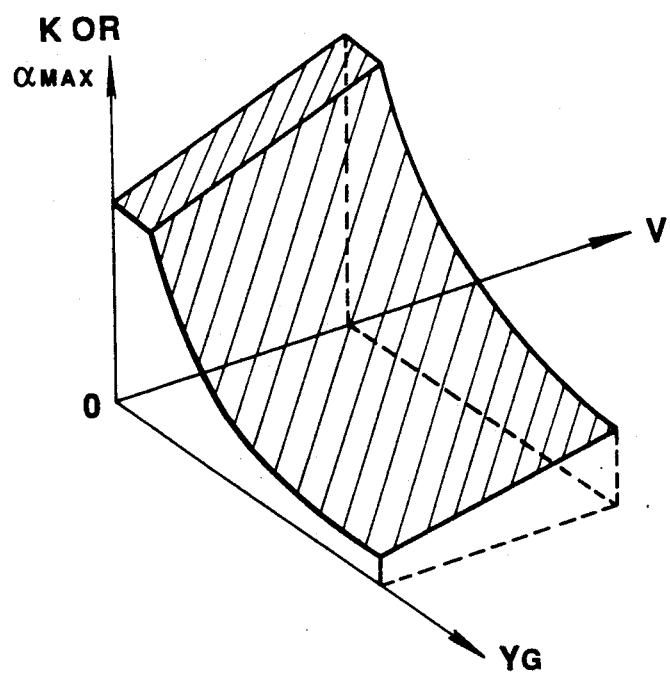
FIG. 11 is a chart illustrating the relationship between the lateral acceleration and the proportional gain as shown in FIG. 7 or the upper limit as shown in FIG. 8, depending on a vehicle speed.
Figure 12:
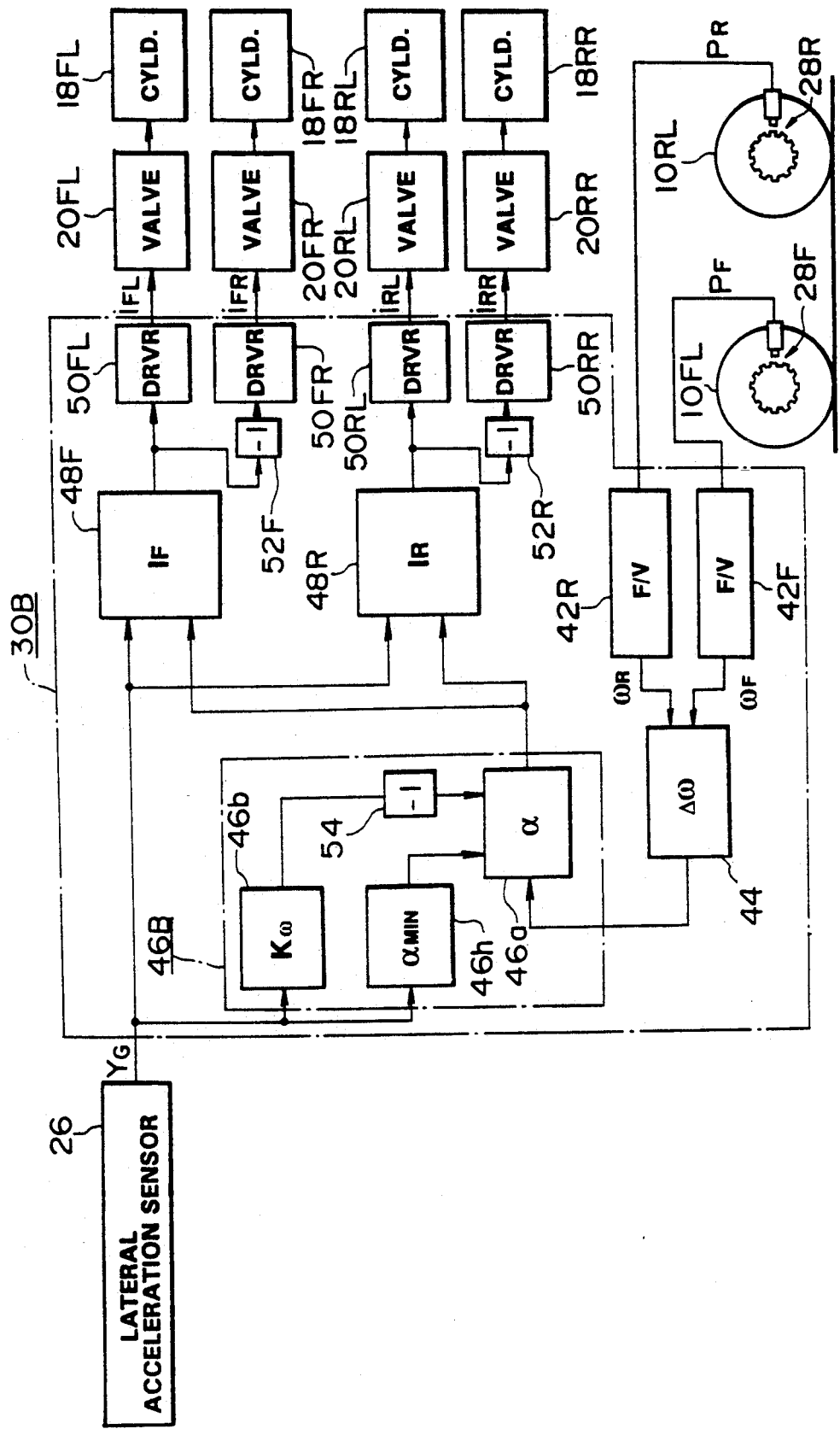
FIG. 12 is a block diagram illustrating a controller employed in the third embodiment of an actively controlled suspension system according to the invention, which is applied for front-wheel drive vehicles.

FIGS. 9 through 11 show the second embodiment. Basically, the construction of the first embodiment is similar to that of the second, third, and fourth embodiments. For the purpose of simplification of description, the same reference numerals used in the first embodiment of FIG. 5 will be applied to the corresponding elements used in the other embodiments of FIGS. 9, 12, and 16. The second embodiment is different from the first embodiment in that the anti-rolling moment distribution-ratio $\alpha$ is varied depending on three control parameters, namely a lateral acceleration $Y_G$, a wheel speed difference $\Delta\omega$, and a vehicle speed V. As shown in FIG. 9, the anti-rolling moment distribution-ratio setting circuit 46A of the controller 30A of the second embodiment includes a fourth function generator 46d in addition to the three function generators 46a, 46b and 46c described in the first embodiment. The function generator 46d receives a vehicle speed indicative signal V output from a vehicle speed sensor 29 and generates a signal indicative of a correction factor Av for correcting both the gain $K\omega$ and the upper limit $\alpha_{MAX}$ in response to the vehicle speed V, as shown in FIG. 10. The circuit 46A also includes an adder 46e for adding the correction factor indicative signal Av to the gain $K\omega$ output from the function generator 46b and an adder 46f for adding the correction factor indicative signal Av to the upper limit $\alpha_{MAX}$ output from the function generator 46c. The function generator 46a generates the anti-rolling moment distribution-ratio indicative signal $\alpha$ for the front suspension system while receiving the adder outputs from both adders 46e and 46f. The other construction of the controller 30A of the second embodiment is similar to the controller 30 of the first embodiment.

According to the second embodiment, the anti-rolling moment distribution-ratio $\alpha$ is determined in such a manner as to add the correction factor indicative signal Av proportional to the vehicle speed indicative signal V to both the gain $K\omega$ and the upper limit $\alpha_{MAX}$. The correction factor indicative signal Av becomes approximately 0 when the vehicle speed is 0 in a vehicle stopping state. Thereafter, when the vehicle starts and the vehicle speed indicative signal V is increased according to an increase in the vehicle speed, the correction factor indicative signal value is increased as shown in FIG. 10. Therefor, both the gain $K\omega$ and the upper limit $\alpha_{MAX}$ are compensated at an upper level in proportion to the vehicle speed V. As shown in FIG. 11, the gain $K\omega$ and the upper limit $\alpha_{MAX}$ both dependent upon the lateral acceleration $Y_G$, are increased according to an increase in the vehicle speed V. As a result, the characteristic curve of the distribution-ratio $\alpha$ of the second embodiment is shifted at an upper level than that of the first embodiment shown in FIG. 6, in proportion to the vehicle speed. That is, the controller 30A of the second embodiment may provide more exaggerated anti-rolling moment distribution between front and rear suspension systems, when compared with the first embodiment. As appreciated from the above, the anti-roll controlling operation according to the second embodiment can provide a stronger understeer tendencies with regard to the rear-wheel drive vehicle during turns on a low friction road so as to assure a high controllability of the vehicle.

Although the correction factor indicative signal Av is respectively added to the gain $K\omega$ and the upper limit $\alpha_{MAX}$, the correction factor indicative signal Av may be added to either the gain $K\omega$ or the upper limit $\alpha_{MAX}$ so as to compensate the anti-rolling moment distribution-ratio indicative signal $\alpha$ depending upon the vehicle speed V. Alternatively, a multiplier may be replaced with an adder so as to provide the above compensation of the distribution-ratio $\alpha$ depending upon the vehicle speed.

Figure 13:
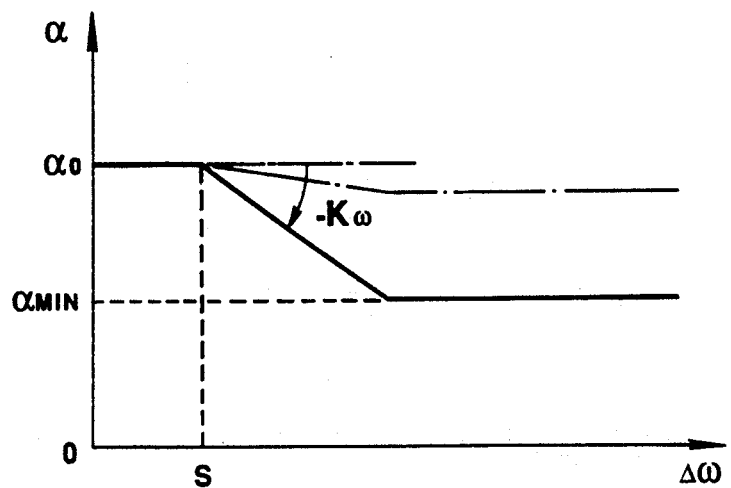
FIG. 13 is a chart illustrating the relationship between the wheel speed difference and the distribution ratio of anti-rolling moment of the front suspension system to the rear suspension system, varied according to the anti-rolling control of the third embodiment.
Figure 14:
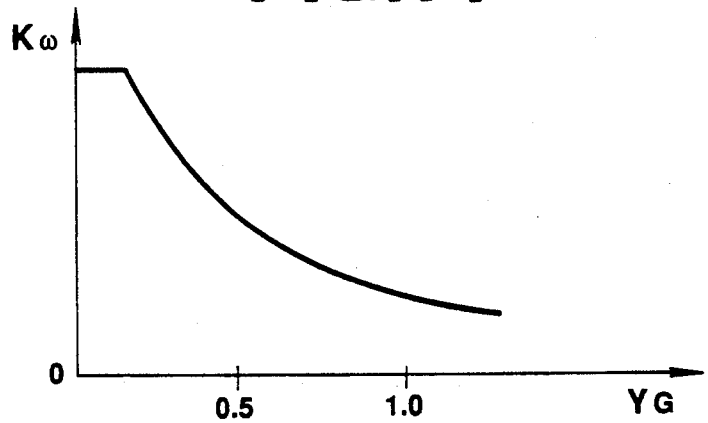
FIG. 14 is a characteristic curve of the proportional gain for the distribution ratio of anti-rolling moment created at the front suspension system with regard to the lateral acceleration, in the third embodiment.
Figure 15:
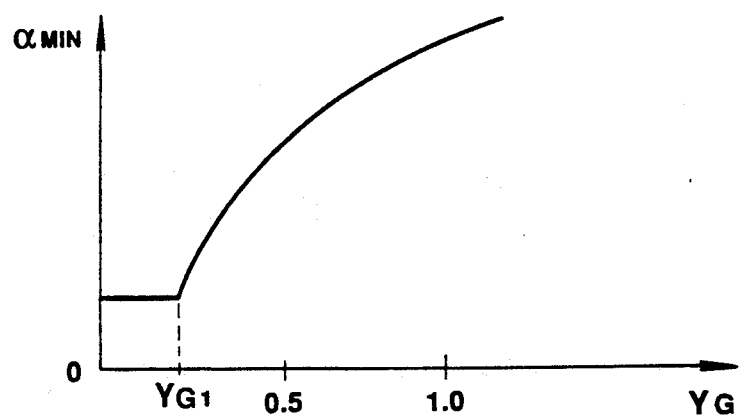
FIG. 15 is a characteristic curve of an upper limit of the distribution ratio of anti-rolling moment created at the front suspension system with regard to the lateral acceleration, in the third embodiment.

FIGS. 12 through 15 show the third embodiment. The third embodiment is different from the first embodiment in that the controller 30B for the anti-rolling moment distribution-ratio $\alpha$ at the front suspension system is applied for front-wheel drive vehicles. As appreciated from FIGS. 5 and 12, the anti-rolling moment distribution-ratio setting circuit 46B of the third embodiment is different from the setting circuit 46 of the first embodiment in that an inverter 54 is provided between the first and third function generators 46b and 46a and the second function generator 46c for the upper limit $\alpha_{MAX}$ is replaced with a function generator 46h for generating a lower limit $\alpha_{MIN}$ having an inherent lower limit characteristic as shown in FIG. 15. As appreciated from FIG. 15, the lower limit $\alpha_{MIN}$ is kept at a lower level until the lateral acceleration indicative signal $Y_G$ reaches a preset lateral acceleration $Y_{G1}$, while the lower limit $\alpha_{MIN}$ is exponentially increased according to an increase in the lateral acceleration indicative signal $Y_G$ when the lateral acceleration indicative signal $Y_G$ exceeds the preset lateral acceleration $Y_{G1}$. As seen in FIG. 14, the function generator 46b employed in the controller 30B of the third embodiment exhibits the same gain characteristic as illustrated in FIG. 7. The function generator 46a of the third embodiment receives the negative gain indicative signal $-K\omega$ inverted by means of the inverter 54 and the lower limit indicative signal $\alpha_{MIN}$ and generates the anti-rolling moment distribution-ratio indicative signal $\alpha$ as shown in FIG. 13.

Referring now to FIG. 13, the distribution-ratio $\alpha$ of anti-rolling moment to be created at the front suspension system is kept in the preset value $\alpha_0$ until the wheel speed difference $\Delta\omega$ reaches the preset threshold S. The distribution-ratio $\alpha$ is decreased with the predetermined proportional gain $-K\omega$ and finally reaches the lower limit $\alpha_{MIN}$, while the wheel speed difference $\Delta\omega$ exceeds the threshold S. After this, even when the wheel speed difference $\Delta\omega$ is subsequently increased, the distribution ratio $\alpha$ is maintained at the lower limit $\alpha_{MIN}$.

According to the third embodiment, when the wheel speed difference $\Delta\omega$ is less than the threshold S during turns irrespective of a road surface condition, the anti-rolling moment distribution-ratio $\alpha$ at the front suspension system is set at the preset value $\alpha_0$, so as to insure a substantially neutral steer. When the wheel speed difference $\Delta\omega$ exceeds the threshold S during turns on a high friction road, such as dry pavement, the gain $K\omega$ is decreased according to the increase in the lateral acceleration indicative signal $Y_G$ and the lower limit $\alpha_{MIN}$ is increased according to the increase in the lateral acceleration indicative signal $Y_G$. At this time, the distribution ratio $\alpha$ is varied along the dotted line of FIG. 13. That is, the distribution ratio $\alpha$ is maintained in the vicinity of the preset value $\alpha_0$, so as to assure a substantially neutral steer. As is generally known, when the front-wheel drive vehicle turns on dry pavement, the vehicle experiences oversteer since the driven wheel speed (front-wheel speed) exceeds the non-driven wheel speed (rear-wheel speed) on dry pavement. The anti-roll controlling operation of the third embodiment can satisfactorily eliminate oversteer tendencies of the front-wheel drive vehicle, occurring during turns on a high friction road.

When the vehicle turns on a low friction road, such as icy roads, the lateral acceleration indicative signal $Y_G$ is maintained at a small value, for example 0.3G or less, as described previously. As appreciated from FIGS. 14 and 15, the function generator 46b generates a relatively great gain $K\omega$ and the function generator 46h generates a relatively small lower limit $\alpha_{MIN}$, with the result that the function generator 46a generates the anti-rolling moment distribution-ratio indicative signal $\alpha$ varied along the solid line shown in FIG. 13. When the wheel speed difference $\Delta\omega$ is less than the preset threshold S, the anti-rolling moment distribution-ratio indicative signal $\alpha$ is kept at the preset value $\alpha_0$ so as to provide a substantially neutral steer. When the wheel speed difference $\Delta\omega$ exceeds the preset threshold S according to an increase in driven-wheel slippage (front-wheel slippage), the distribution-ratio $\alpha$ is decreased with a great negative gain $-K\omega$ according to an increase in the wheel speed difference $\Delta\omega$, while the anti-rolling moment distribution-ratio $(1-\alpha)$ at the rear suspension system is increased according to the wheel speed difference $\Delta\omega$. Since the lateral load shift at the front suspension system is proportional to the distribution ratio $\alpha$ and the lateral load shift at the rear suspension system is proportional to the distribution ratio $(1-\alpha)$, the lateral load shift distribution-ratio of the front suspension system to the rear suspension system is rapidly decreased according to the increase in the wheel speed difference $\Delta\omega$, during turns on a low friction road. In other words, the anti-rolling stiffness at the front suspension system is rapidly decreased, while the anti-rolling stiffness at the rear suspension system is rapidly increased according to the increase in the wheel speed difference $\Delta\omega$, during turns on a low friction road. This results in a sufficient road grip at front wheels (driven wheels) and a slight rear-end skid of the vehicle. In this manner, during turns on a low friction road, such an anti-roll controlling operation executed for the front-wheel drive vehicles can effectively eliminate understeer occurring due to front-end skid generally created by driven wheel slippage and change the steering characteristics from understeer to a substantially neutral steer so as to provide an easy steering effort on curves on a low friction road.

Figure 16:
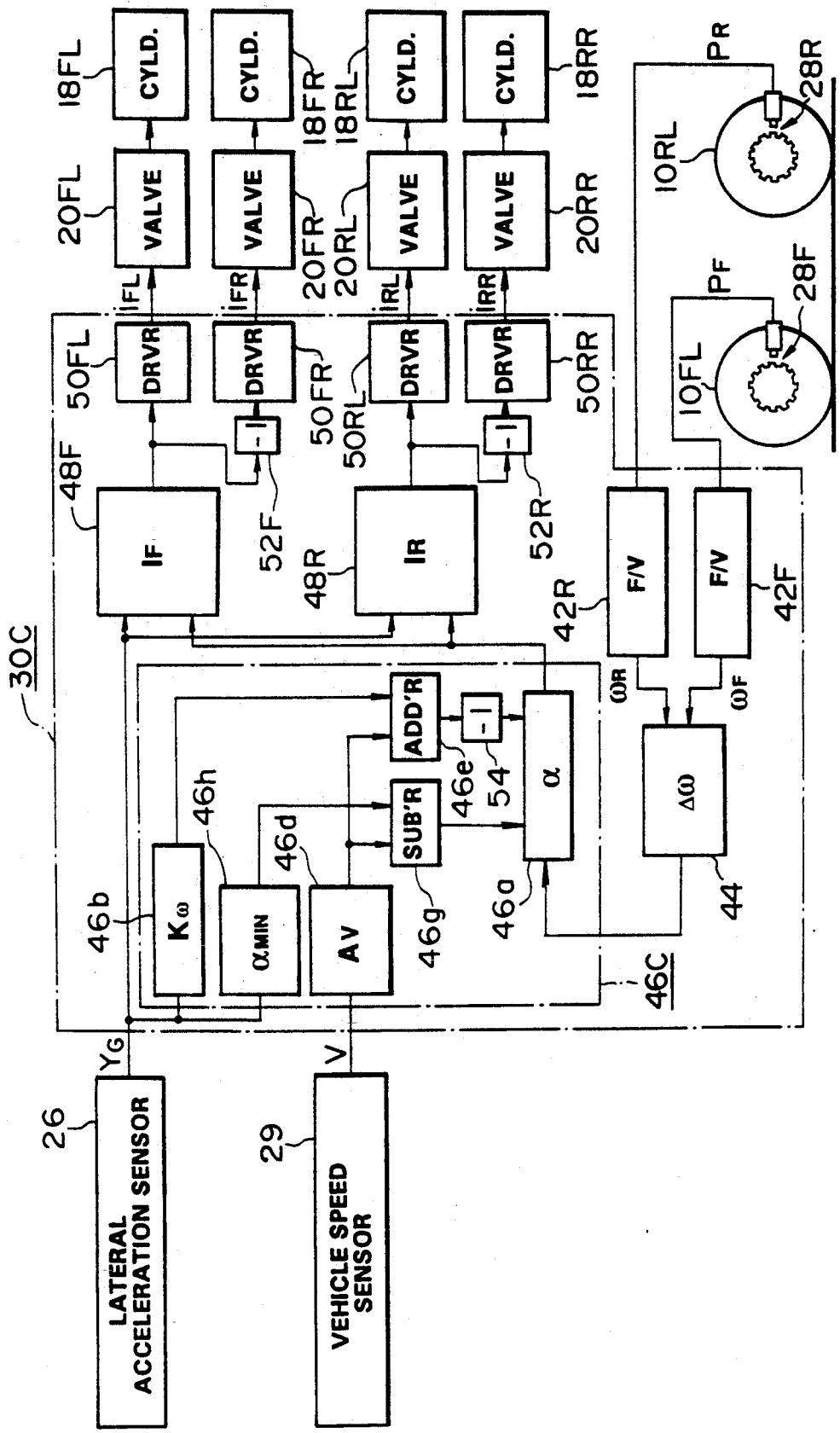
FIG. 16 is a block diagram illustrating a controller employed in the fourth embodiment of an actively controlled suspension system according to the invention which is applied for front-wheel drive vehicles.
Figure 17:
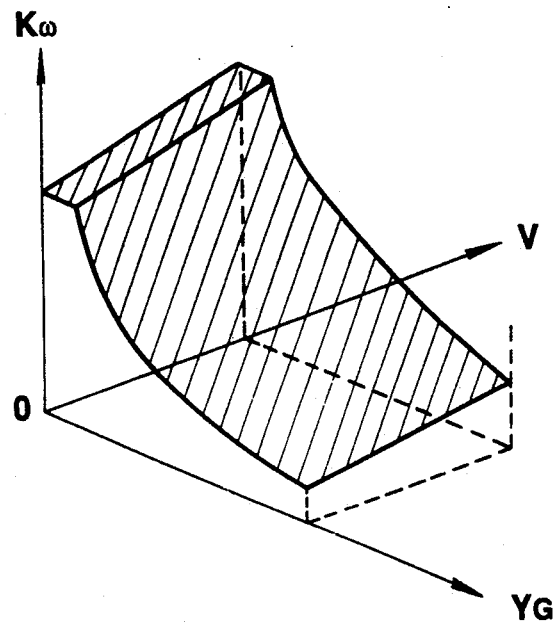
FIG. 17 is a chart illustrating the relationship between the lateral acceleration and the proportional gain as shown in FIG. 14, depending on the vehicle speed.
Figure 18:
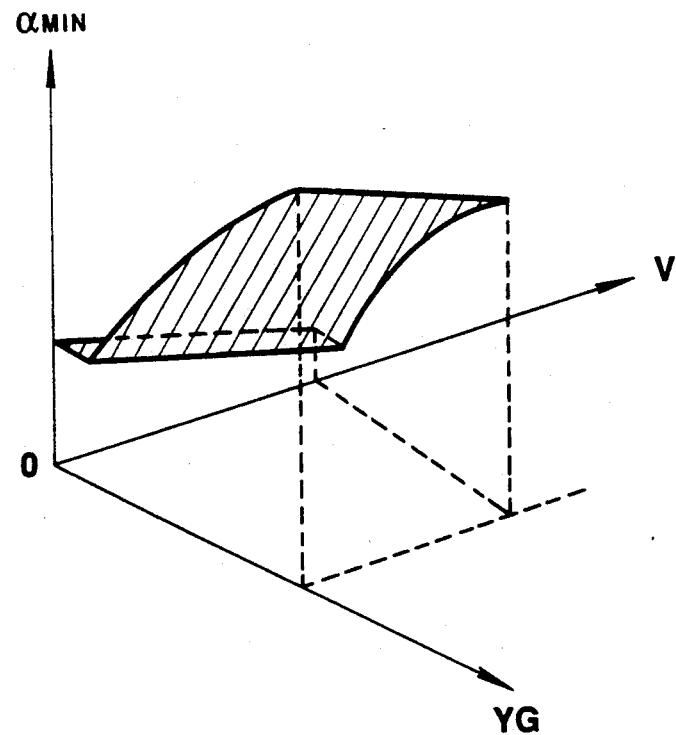
FIG. 18 is a chart illustrating the relationship between the lateral acceleration and the upper limit as shown in FIG. 15, depending on the vehicle speed.

FIGS. 16 through 18 show the fourth embodiment. The fourth embodiment is different from the third embodiment in that the anti-rolling moment distribution-ratio $\alpha$ is varied depending on three control parameters, namely a lateral acceleration $Y_G$, a wheel speed difference $\Delta\omega$, and a vehicle speed V. As shown in FIG. 16, the anti-rolling moment distribution-ratio setting circuit 46C of the controller 30C of the fourth embodiment includes a fourth function generator 46d in addition to the three function generators 46a, 46b and 46h described in the third embodiment. The function generator 46d of the fourth embodiment of FIG. 16 is similar to that of the second embodiment of FIG. 9. The function generator 46d receives the vehicle speed indicative signal V output from the vehicle speed sensor 29 and generates a signal indicative of a correction factor Av for correcting both the gain $K\omega$ and the lower limit $\alpha_{MIN}$ in response to the vehicle speed V, as shown in FIG. 10. The circuit 46C also includes an adder 46e for adding the correction factor indicative signal Av to the gain $K\omega$ output from the function generator 46b and a subtractor 46g for subtracting the correction factor indicative signal Av from the lower limit $\alpha_{MIN}$ output from the function generator 46h. The function generator 46a generates the anti-rolling moment distribution-ratio indicative signal $\alpha$ for the front suspension system while receiving the adder output from the adder 46e and the subtractor output from the subtractor 46g. In FIG. 16, adder 46e and subtractor 46g are identified as "ADDR" and "SUB'R" respectively. The other construction of the controller 30C of the fourth embodiment is similar to the controller 30B of the third embodiment.

According to the fourth embodiment, the anti-rolling moment distribution-ratio $\alpha$ is determined in such a manner as to add the correction factor indicative signal Av proportional to the vehicle speed indicative signal V to the gain $K\omega$ and to subtract the correction factor indicative signal Av from the lower limit $\alpha_{MIN}$. The correction factor indicative signal Av is approximately 0 when the vehicle speed is in the vicinity of 0. When the the vehicle speed indicative signal V is increased according to the increase in the vehicle speed, the correction factor indicative signal value is increased as shown in FIG. 10. Therefor, the gain $K\omega$ is compensated at an upper level and the lower limit $\alpha_{MIN}$ is compensated at a lower level, in proportion to the vehicle speed V. As shown in FIG. 17, the lateral acceleration dependent gain $K\omega$ is increased according to the increase in the vehicle speed V. On the other hand, as shown in FIG. 18, the lateral acceleration dependent lower limit $\alpha_{MIN}$ is decreased according to the increase in the vehicle speed V. As a result, the characteristic curve of the distribution-ratio $\alpha$ of the fourth embodiment is shifted at a lower level than that of the third embodiment shown in FIG. 13, in proportion to the vehicle speed. That is, the controller 30C of the fourth embodiment may provide more exaggerated anti-rolling moment distribution between front and rear suspension systems, when compared with the third embodiment. As appreciated from the above, the anti-roll controlling operation according to the fourth embodiment can provide a stronger oversteer tendencies with regard to the front-wheel drive vehicle during turns on a low friction road so as to assure a high controllability of the vehicle.

As will be appreciated from the above, actively controlled suspension system for automotive vehicles can allow steering characteristics of the vehicle to maintain in the vicinity of a substantially neutral steer, irrespective of a road surface condition, such as icy, snow or wet roads and dry pavement, the magnitude of a lateral acceleration exerted on the vehicular body, and the wheel speed difference between a driven wheel and a non-driven wheel.

Although in the preferred embodiments, electronic circuits are utilized as a controller for an anti-roll controlling system, a microcomputer may be utilized.

The pressure control valve 20 may be replaced with a fluid flow control valve.

Although front-left and rear-left wheel speed sensors are utilized in the embodiments, front-right and rear-right wheel speed sensors may be utilized. In order to provide a higher detection accuracy for front and rear wheel speeds, four wheel speed sensors may be utilized for deriving the front and rear wheel speeds from a mean value of the monitored front-left and front-right wheel speeds and a mean value of the monitored rear-left and rear-right wheels speeds.

Furthermore, although hydraulic oil is utilized as working fluid for a hydraulic cylinder, fluid having low-compressibility may be utilized as working fluid.

In the embodiments, the preset value a $\alpha_0$ to be preset in the function generator 46a is selected such that the steering characteristics of the vehicle is maintained in a substantially neutral steer when the wheel speed difference $\Delta\omega$ is less than a preset threshold. The preset value $\alpha_0$ may be selected such that the steering characteristics is maintained in a lesser understeer.

Moreover, although a hydraulic cylinder is used as a fluid pressure actuated cylinder, the hydraulic cylinder may be replaced with the other cylinders, such as a pneumatic cylinder, a variable stiffness stabilizer, or the like.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. An actively controlled suspension system for an automotive vehicle, comprising:
   means for monitoring a lateral acceleration exerted on a vehicle body, to generate a lateral acceleration indicative signal;
   means for controlling a lateral load shift between left and right wheels depending on said lateral acceleration indicative signal so as to suppress rolling of said vehicle body;
   means for controlling a distribution ratio of said lateral load shift, between a driven wheel side of said suspension system and a non-driven wheel side of said suspension system, so as to enhance steering characteristics of said vehicle;
   means for monitoring a driven wheel speed to generate a driven wheel speed indicative signal;
   means for monitoring a non-driven wheel speed to generate a non-driven wheel speed indicative signal; and
   said lateral load shift distribution ratio controlling means including means for selecting a change mode of said distribution ratio depending on both said lateral acceleration and a wheel speed difference derived from said driven wheel speed indicative signal and said non-driven wheel speed indicative signal.

2. The actively controlled suspension system as set forth in claim 1, wherein said change mode selecting means determines said change mode of distribution ratio such that said distribution ratio of said non-driven wheel side of said suspension system is increased according to an increase in said wheel speed difference and a rate of change in said distribution ratio of said non-driven wheel side of said suspension system is decreased according to the increase in said lateral acceleration.

3. The actively controlled suspension system as set forth in claim 2, wherein said change mode selecting means comprises a first function generating means for holding said distribution ratio at a designated reference value when said wheel speed difference is less than a preset threshold, and for increasing said distribution ratio of said non-driven wheel side of said suspension system with a controllable gain according to an increase in said wheel speed difference after said wheel speed difference reaches said threshold, and a second function generating means for attenuating the rate of change of said distribution ratio according to the increase in said lateral acceleration such that said distribution ratio is approached towards said designated reference value.

4. The actively controlled suspension system as set forth in claim 3, wherein said second function generating means includes a function generator for exponentially decreasing said controllable gain according to the increase in said lateral acceleration and another function generator for compensating a limit of said distribution ratio towards said designated reference value according to the increase in said lateral acceleration.

5. The actively controlled suspension system as set forth in claim 1, wherein said lateral load shift controlling means linearly increases said lateral load shift in proportion to the increase in said lateral acceleration.

6. The actively controlled suspension system as set forth in claim 1, which further comprises means for monitoring a vehicle speed so as to determine said change mode of said distribution ratio, depending on said lateral acceleration, said wheel speed difference and said vehicle speed.

7. The actively controlled suspension system as set forth in claim 6, wherein said lateral load shift distribution ratio controlling means includes means for increasing the rate of change of said distribution ratio by a designated correction factor increased according to an increase in said vehicle speed.

8. The actively controlled suspension system as set forth in claim 7, wherein said correction factor is increased in a linear fashion according to the increase in said vehicle speed.

9. An actively controlled suspension system for an automotive vehicle, comprising:
a first suspension system disposed between a vehicle body and a suspension member rotatably suspending at least on pair of non-driven wheels, said first suspension system employing a first pair of fluid pressure operated cylinders, for providing a first lateral load shift variable via working fluid pressure supplied thereto;
a second suspension system disposed between the vehicle body and a suspension member rotatably suspending at least one pair of driven wheels, said second suspension system employing a second pair of fluid pressure operated cylinders, for providing a second lateral load shift variable via working fluid pressure supplied thereto;
first fluid pressure control valve means connected to said first pair of cylinders, for varying said first lateral load shift created at said first suspension system in accordance with a first command;
second fluid pressure control valve means connected to said second pair of cylinders, for varying said second lateral load shift created at said second suspension system in accordance with a second command;
means for monitoring a lateral acceleration exerted on the vehicle body;
means for deriving a wheel speed difference between a driven wheel speed and a non-driven wheel speed;
means for controlling said first and second lateral load shifts independently of each other so as to suppress rolling of said vehicle body and to enhance steering characteristics of said vehicle;
said controlling means including a first arithmetic means for deriving an entire magnitude of said first and second lateral load shifts depending on said lateral acceleration such that said entire magnitude is proportional to said lateral acceleration, and a second arithmetic means for deriving a distribution ratio between said first and second lateral load shifts depending on both said lateral acceleration and said wheel speed difference such that a distribution ratio of said first lateral load shift is increased according to an increase in said wheel speed difference and a rate of change in said distribution ratio of said first lateral load shift is decreased according to the increase in said lateral acceleration; and
said controlling means generating said first and second commands based on both said entire magnitude and said distribution ratio between said first and second lateral load shifts.

10. The actively controlled suspension system as set forth in claim 9, which further comprises a vehicle speed sensor for monitoring a vehicle speed so as to increase the rate of change of said distribution ratio of said first lateral load shift by a designated correction factor increased in a linear fashion according to an increase in said vehicle speed.

11. An actively controlled suspension system for a rear-wheel drive vehicle, comprising:
a front suspension system disposed between a vehicle body and a suspension member rotatably suspending at least one pair of front wheels, said front suspension system employing a front pair of fluid pressure operated cylinders, for providing a front lateral load shift variable via working fluid pressure supplied thereto;
a rear suspension system disposed between the vehicle body and a suspension member rotatably suspending at least one pair of rear wheels, said rear suspension system employing a rear pair of fluid pressure operated cylinders, for providing a rear lateral load shift variable via working fluid pressure supplied thereto;
front fluid pressure control valve means connected to said front pair of cylinders, for varying said front lateral load shift created at said front suspension system in accordance with a first command;
rear fluid pressure control valve means connected to said rear pair of cylinders, for varying said rear lateral load shift created at said rear suspension system in accordance with a second command;
means for monitoring a lateral acceleration exerted on the vehicle body;
means for deriving a wheel speed difference between front and rear wheel speeds;
means for controlling said front and rear lateral load shifts independently of each other so as to suppress rolling of said vehicle body and to enhance steering characteristics of said vehicle;
said controlling means including a first arithmetic means for deriving an entire magnitude of said front and rear lateral load shifts depending on said lateral acceleration such that said entire magnitude is proportional to said lateral acceleration, and a second arithmetic means for deriving a distribution ratio between said front and rear lateral load shifts depending on both said lateral acceleration and said wheel speed difference such that a distribution ratio of said front lateral load shift is increased according to an increase in said wheel speed difference and a rate of change in said distribution ratio of said front lateral load shift is decreased according to the increase in said lateral acceleration;

said controlling means generating said first and second commands based on both said entire magnitude and said distribution ratio between said first and second lateral load shifts;

said second arithmetic means including a first function generating means for holding said distribution ratio of said front lateral load shift at a designated reference value when said wheel speed difference is less than a preset threshold, and for increasing said distribution ratio of said front lateral load shift with a controllable gain according to an increase in said wheel speed difference after said wheel speed difference reaches said threshold, and a second function generating means for attenuating the rate of change of said distribution ratio of said front lateral load shift according to the increase in said lateral acceleration such that said distribution ratio is approached towards said designated reference value.

12. The actively controlled suspension system as set forth in claim 11, wherein said second function generating means includes a function generator for exponentially decreasing said controllable gain according to the increase in said lateral acceleration and another function generator for exponentially decreasing an upper limit of said distribution ratio of said front lateral load shift towards said designated reference value according to the increase in said lateral acceleration.

13. The actively controlled suspension system as set forth in claim 11, which further comprises a vehicle speed sensor for monitoring a vehicle speed so as to increase the rate of change in said distribution ratio of said front lateral load shift by a designated correction factor increased in a linear fashion according to an increase in said vehicle speed.

14. An actively controlled suspension system for a front-wheel drive vehicle, comprising:

a front suspension system disposed between a vehicle body and a suspension member rotatably suspending at least one pair of front wheels, said front suspension system employing a front pair of fluid pressure operated cylinders, for providing a front lateral load shift variable via working fluid pressure supplied thereto;

a rear suspension system disposed between the vehicle body and a suspension member rotatably suspending at least one pair of rear wheels, said rear suspension system employing a rear pair of fluid pressure operated cylinders, for providing a rear lateral load shift variable via working fluid pressure supplied thereto;

front fluid pressure control valve means connected to said front pair of cylinders, for varying said front lateral load shift created at said front suspension system in accordance with a first command;

rear fluid pressure control valve means connected to said rear pair of cylinders, for varying said rear lateral load shift created at said rear suspension system in accordance with a second command;

means for monitoring a lateral acceleration exerted on the vehicle body;

means for deriving a wheel speed difference between front and rear wheel speeds;

means for controlling said front and rear lateral load shifts independently of each other so as to suppress rolling of said vehicle body and to enhance steering characteristics of said vehicle;

said controlling means including a first arithmetic means for deriving an entire magnitude of said front and rear lateral load shifts depending on said lateral acceleration such that said entire magnitude is proportional to said lateral acceleration, and a second arithmetic means for deriving a distribution ratio between said front and rear lateral load shifts depending on both said lateral acceleration and said wheel speed difference such that a distribution ratio of said rear lateral load shift is increased according to an increase in said wheel speed difference and a rate of change in said distribution ratio of said rear lateral load shift is decreased according to the increase in said lateral acceleration;

said controlling means generating said fist and second commands based on both said entire magnitude and said distribution ratio between said first and second lateral load shifts; and said second arithmetic means including a first function generating means for holding said distribution ratio of said front lateral load shift at a designated reference value when said wheel speed difference is less than a present threshold, and for decreasing said distribution ratio of said front lateral load shift with a negative controllable gain according to an increase in said wheel speed difference after said wheel speed difference reaches said threshold, and a second function generating means for attenuating the rate of change of said distribution ratio of said front lateral load shift according to the increase in said lateral acceleration such that said distribution ratio is approached towards said designated reference value.

15. The actively controlled suspension system as set forth in claim 14, wherein said second function generating means includes a function generator for exponentially increasing said negative controllable gain according to the increase in said lateral acceleration and another function generator for exponentially increasing a lower limit of said distribution ratio of said front lateral load shift towards said designated reference value according to the increase in said lateral acceleration.

16. The actively controlled suspension system as set forth in claim 14, which further comprises a vehicle speed sensor for monitoring a vehicle speed so as to increase the rate of change in said distribution ratio of said front lateral load shift by a designated correction factor increased in a linear fashion according to an increase in said vehicle speed.

* * * * *